United States Patent [19]
Krasik et al.

[11] 3,867,669
[45] Feb. 18, 1975

[54] POWER SOURCE WITH A SPARKPROOF OUTPUT

[76] Inventors: Yakov Lvovich Krasik, Universitetskaya ulitsa, 54, kv. 41; Leonid Iosifovich Rappoport, ulitsa Schorsa, 69, kv. 23; Anatoly Nikolaevvich Gelbin, ulitsa Schorsa, 61, kv. 42; Nikolai Andreevich Marsjuk, ulitsa Stadionnaya, 8, kv. 64; Anatoly Nikitovich Gura, ulitsa Kooperativnaya, 114, kv. 33; Boris Mefodievich Kirichenko, ulitsa kapitana Ratnikova, 28, kv. 4, all of Donetsk, U.S.S.R.

[22] Filed: Jan. 11, 1974

[21] Appl. No.: 432,651

[52] U.S. Cl. .................. 317/16, 317/22, 317/33 SC, 317/DIG. 6
[51] Int. Cl. ............................................. H02h 7/10
[58] Field of Search ............... 317/16, 22, 31, 33 SC, 317/33 R, 33 VR, 50, 43, 39, DIG. 6; 307/202; 328/172; 321/11; 322/91; 323/22 SC

[56] References Cited
UNITED STATES PATENTS

| | | |
|---|---|---|
| 3,456,182 | 7/1969 | Cummins et al. ..................... 322/91 |
| 3,488,560 | 1/1970 | Konopa ................................ 317/50 |
| 3,581,150 | 5/1971 | Kirk et al. ............................ 317/50 |
| 3,601,685 | 8/1971 | Kuhn .............................. 317/33 SC |
| 3,614,531 | 10/1971 | Oswald ................................ 317/16 |
| 3,702,962 | 11/1972 | Wohr et al. ...................... 317/33 SC |

*Primary Examiner*—Donovan F. Dugan
*Assistant Examiner*—Patrick R. Salce
*Attorney, Agent, or Firm*—Holman & Stern

[57] ABSTRACT

A power source with a sparkproof output, comprising a transformer with a rectifier, a spark proofing unit for limiting electric energy released as a result of commutation of the output circuit of the power source, which incorporates an inductive element, made in the present embodiment in the form of a choke, and thyristors and is connected to the output of the rectifier, characterized, in accordance with the invention, in that it is provided with an automatic reclosing unit designed to restore the output electric parameters of the power source after operation of the spark proofing unit and built around additional thyristors, whose number corresponds to that of output windings of the transformer, each additional thyristor being connected in parallel with a respective output winding, and diodes incorporated in the control circuits of the additional thyristors.

2 Claims, 2 Drawing Figures

POWER SOURCE WITH A SPARKPROOF OUTPUT

BACKGROUND OF THE INVENTION

The present invention relates generally to means for automating production processes in explosive media and more particularly, it relates to power sources with a sparkproof output. The invention may find application in mining and at petroleum processing and chemical plants for supplying power to electric control, indicating and signalling systems with high power consumption, that incorporate electroautomatic devices capable of storing energy, such as electromagnetic relays, electrohydrovalves, etc.

It is known that a value of energy of an electric discharge resulting from a commutation of a spark-proof electric circuit does not exceed a maximum permissible limit with regard to spark proofing requirements.

Limitation of energy of an electric discharge in the course of commutation of output circuits of sparkproof power sources is carried out due to limiting output electric parameters and through forcibly cutting down the duration of the discharge.

There are known at present power sources with a sparkproof output with linear current-limiting elements, comprising a transformer and rectifier. Connected to the power circuit of the rectifier, in series with the load, is a resistor which limits the short-circuit current of the power source, thus making the output circuit thereof spark-proof.

There are also known power sources with non-linear spark-limiting elements, comprising a transformer and a rectifier, but differing from the foregoing ones in that connected to the power circuit or the rectifier, in series with the load, is a non-linear current-limiting element.

A non-linear current-limiting element may be built around transistors connected, via base-collector junctions, to the output circuit of the power source, in series with the load.

The base-emitter junction of the transistors is connected to an additional bias voltage source. When the load current exceeds a predetermined value of the emitter current, the resistance of the base-collector junction of the transistors raises sharply and brings the load current down to a spark-proof value.

There is known a non-linear current-limiting element incorporating a resistor and a thyristor. The resistor is connected to the output circuit of the rectifier of the power source, in parallel with the load, whereas the thyristor is connected in parallel with the output terminals of the rectifier.

When the load current exceeds a sparkproof value, the voltage across the resistor exceeds a preset value and switches on the thyristor.

The thyristor is conducting and shunts the load. The value of the load current is brought down to reach a sparkproof value.

The basic disadvantage of the above power sources resides in a small sparkproof output power imparted to the load due to great losses in the current-limiting elements.

Power sources, wherein limitation of energy in an electric discharge is attained through forcibly limiting the duration of the discharge, comprise a transformer with a rectifier, and a spark-proofing unit designed to limit electic energy released in the course of switching the output circuit of the power source, incorporating an inductive element and thyristors and connected to the output of the rectifier.

When the power source is switched on, the circuit voltage is converted by the transformer and the rectifier and is applied to the load. At the moment of switching on the load, an electromotive force is induced in the inductive element, applied to the output of the thyristor of the spark-proofing unit, so that the thyristor becomes conducting.

The conducting thyristor shunts the output circuit of the power source. No more energy is supplied to the electric discharge. This makes the output circuit of the power source sparkproof.

Having a great sparkproof output power, this power source is characterized by breaks of output voltage in the course of operation of the spark-proofing unit at the moment of switching on the load. For that reason, it can only feed a permanent load.

This is a serious disadvantage of the above power source.

SUMMARY OF THE INVENTION

It is an object of the present invention to eliminate that disadvantage.

The present invention essentially aims at providing means for automatic restoration of rated output electric parameters of a power source following operation of spark-proofing means thereof and also at ruling out breaks in the load voltage and making adjustment of the power source dispensable. This will exclude breaks in the feeding of the load in the course of commutations thereof and ensure normal operation of power-fed systems, whose power consumption changes in time and which employ electroautomatic elements capable of storing electromagnetic energy.

The above object is attained by providing a power source with a sparkproof output, comprising a transformer with a rectifier, a spark-proofing unit designed for limiting electic energy released in the course of switching the output circuit of the power source, incorporating an inductive element and thyristors and connected to the output of the rectifier, which is provided, according to the invention, with an automatic reclosing unit designed to restore the output electric parameters of the power source following an operation of the sparkproofing unit and built around additional thyristors, whose number corresponds to that of the output windings of the transformer, each additional thyristor being connected in parallel with a respective output winding, and diodes incorporated in the control circuits of the additional thyristors.

It is expedient that the power source with a sparkproof output be provided with an additional channel connected via a diode to the output of the power source.

The proposed power source with a sparkproof output ensures feeding of power-consuming loads with energy accumulators.

Having a great sparkproof output power, it makes it possible to reduce the dimensions and cost of automatic equipment as a result of a decrease in the number of power sources. The output power of the proposed source amounts to 50 watts and is several times higher than that of known power sources with a sparkproof output.

The provision of the proposed power source with an automatic reclosing unit reduces breaks of power supply to the load in the course of switchings of the electric circuit, which ensures normal functioning of the power-fed electric system and expands the sphere of application of power sources. The presence of an additional power supply channel rules out breaks of power supply to the load in the course of switching thereof.

BRIEF DESCRIPTION OF THE DRAWINGS

The present invention will hereinafter be explained in greater detail with reference to preferred embodiments thereof taken in conjunction with the accompanying drawings, wherein.

DESCRIPTION OF THE PREFERRED EMBODIMENTS

Figure 1:
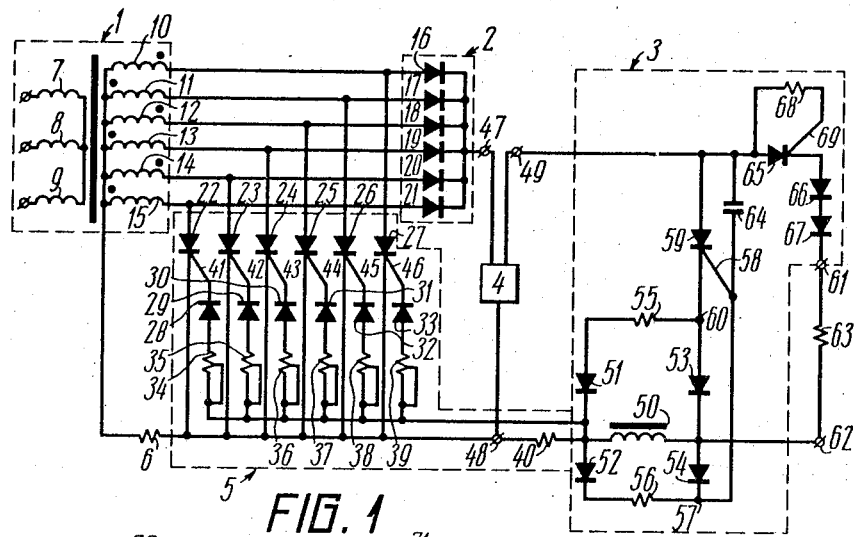
FIG. 1 shows an electric circuit of the power source with a sparkproof output, in accordance with the invention.

Referring now to FIG. 1, the proposed power source with a sparkproof output comprises a transformer 1 with a half-wave rectifier 2, a spark proofing unit 3 designed to limit electric energy released in the course of switching the output circuit of the power source, a stabilizer 4 and an automatic reclosing unit 5 which ensures restoration of output electric parameters of the power source following operation of the spark proofing unit 3.

The automatic reclosing unit 5 and the stabilizer 4 are connected, via a resistor 6, to the output of the transformer 1 and the rectifier 2, respectively.

The spark proofing unit 3 is connected to the output of the stabilizer 4.

The transformer 1 is made of electric steel and has three equidimensional legs (not shown). It has three current windings 7–9 and six output windings 10–15. Mounted upon each leg are one current winding and two output windings. The start and the end of each pair of the output windings 10–15 surrounding a separate leg, 10 and 11, 12 and 13, 14 and 15, respectively, are connected to form a single terminal.

In the accompanying drawings, the starts of the output windings 10–15 are shown by dots.

The current windings 7, 8 and 9 form a star connection; the output windings 10–15 form a six-phase circuit.

The half-wave rectifier 2 employs six diodes 16–21, whose cathodes are connected into one terminal. The plate of each diode of the rectifier 2 is connected to the free end of one of the output windings 10–15. The plate of the diode 16 is connected to the start of the output winding 10, the plate of the diode 17 is connected to the end of the output winding 11, etc.

The automatic reclosing unit employs six additional thyristors 22–27, six diodes 28–33 and seven resistors 34–40. The plates of the additional thyristors 22–27 are connected to the common points of connection of the output windings 10–15 of the transformer 1 to the plates 16–21 of the rectifier 2.

The plate of the additional thyristor 22 is connected to the common point of connection of the output circuit 15 to the plate of the diode 21; the plate of the additonal thyristor 23 is connected to the common point of connection of the output winding 14 to the plate of the diode 20, etc. Control electrodes 41–46 of the thyristors 22–27 are connected to the cathodes of the diodes 28–33. As is shown in FIG. 1, the control electrode 41 of the additional thyristor 22 is connected to the cathode of the diode 28; the control electrode 42 of the additional thyristor 23 is connected to the cathode of the diode 29, etc.

The plates of the diodes 28–33 are connected, via the resistors 34–39 with regulable resistance, to a common point and, via the resistor 40, to the cathodes of the additional thyristors 22–27. The cathodes of the latter are connected to a common point and, via the resistor 6, to the common point of connection of the output windings 10–15 of the transformer 1.

The voltage stabilizer 4 may be built in the known way around semiconductor or other elements. It has an input 47–48 and an output 48–49.

The spark proofing unit 3 makes the output circuit of the power source sparkproof. The unit includes an inductive element in the form of a choke 50 connected to the diagonal of the rectifier 2 with diodes 51–54 and resistors 55 and 56.

A positive pole 57 of this rectifier is connected to a control electrode 58 of a thyristor 59, whereas its negative pole 60 is connected to the cathode of the thyristor 59.

The choke 50 is meant to control the rate of change of the current through an output circuit 61–62 of the power source connected whereto is a load 63.

The plate of the thyristor 59 is coupled via the stabilizer 4 to the common outlet of the cathodes of the diodes 16–21 of the rectifier 2, whereas its cathode is coupled via the diode 53 and the choke 50 to the common outlet of the resistors 34–39 and the resistor 40.

Connected between the plate and the control electrode 58 of the thyristor 59 is a capacitor 64 which accelerates the conduction of the thyristor 59, as voltage appears across the choke 50 at the moment of commutation of the output circuit 61–62. In order to insulate the rectifier 2 from the load 63, as the thyristor 59 is switched on, connected to the power circuit of the power source is a diode circuit consisting of a thyristor 65 and two diodes, 66 and 67, all connected in series.

The plate of the thyristor 65 is connected to that of the thyristor 59 and, via a resistor 68, to a control electrode 69.

The cathodes of the thyristor 65 and the diodes 66 and 67 face the load 63.

Figure 2:
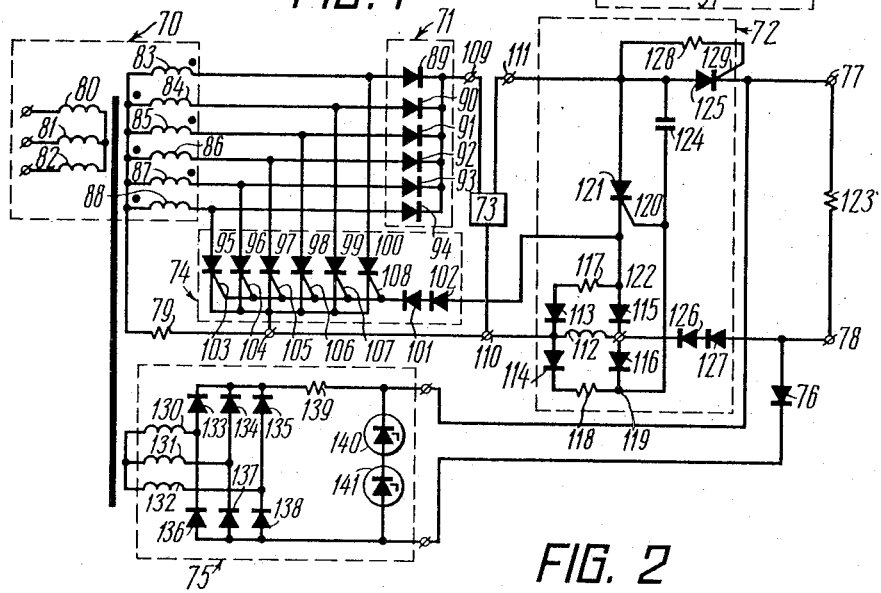
FIG. 2 shows an alternative embodiment of an electric circuit of the power source with a sparkproof output.

The power source with a sparkproof output, shown in FIG. 2 comprises a transformer 70 with a half-wave rectifier 71, a spark proofing unit 62 designed to limit electric energy released in the course of switching the output circuit of the power source, a stabilizer 73, an automatic reclosing unit 74 to ensure restoration of output electric parameters of the power source following operation of the spark proofing unit 72, an additional power supply channel 75, a diode 76 and an output circuit 77–78.

The automatic reclosing unit 74 and the stabilizer 73 are coupled via a resistor 79 to outputs of the transformer 70 and the rectifier 71, respectively.

The spark proofing unit 72 is connected to the output of the stabilizer 73.

The additional power supply channel 75 is coupled, via the diode 76, to the output terminals 77 and 78 of the power source.

The transformer 70 is made of electrical steel, and has three equidimensional legs (not shown).

It has three current windings 80–82 and six output windings 83–88.

Each leg is surrounded by one current winding and two output windings.

The start and end of each pair of the output windings 83–88 surrounding a separate leg, 83 and 84, 85 and 86, and 87 and 88, respectively, are connected to form a common outlet.

The starts of the output windings 83–88 are shown in the accompanying drawings by dots.

The current windings 80–82 form a star connection; the output windings 83–88 form a six-phase circuit.

The half-wave rectifier 71 is built around six diodes 89–94, whose cathodes are connected to form a common outlet.

The plate of each individual diode of the rectifier 71 is connected to a free end of one of the output windings 83–88.

The plate of the diode 89 is connected to the start of the output winding 83; the plate of the diode 90 is connected to the end of the output winding 84, etc.

The automatic reclosing unit 74 employs six additional thyristors 95–100 and two diodes 101 and 102.

The plates of the additional thyristors 95–100 are connected to the common points of connection of the output windings 83–88 of the transformer 70 to the plates of the diodes 89–94 of the rectifier 71.

The plate of the additional thyristor 95 is connected to the common point of connection of the output winding 88 to the plate of the diode 94; the plate of the additional thyristor 95 is connected to the common point of connection of the output winding 87 to the plate of the diode 93, etc.

Control electrodes 103–108 of the additional thyristors 95–100 are connected to form a common outlet and coupled to the two seriesly connected diodes 101 and 102. The cathodes of the diodes 101 and 102 face the control electrodes 103–108 of the additional thyristors 95–100.

The cathodes of the additional thyristors 95–100 are connected to a common outlet and coupled, via the resistor 79, to the common point of connection of the output windings 83–88 of the transformer 70.

The voltage stabilizer 73 may be built in a conventional manner around semiconductor or other elements. It has an input 109–110 and an output 110–111.

The spark proofing unit 72 makes the output circuit 77–78 of the power source sparkproof. It comprises an inductive element in the form of a choke 112 which is connected to the diagonal of the rectifier 71 with diodes 113–116 and resistors 117 and 118. A positive pole 119 of the rectifier 71 is connected to a control electrode 120 of the thyristor 121, whereas its negative pole 122 is connected to the cathode of the thyristor 120.

The choke 112 is designed to control the rate of changing of the current in the output circuit 77–78 of the power source, connected whereto is a load 123.

The plate of the thyristor 121 is coupled, via the stabilizer 73, to the common outlet of the cathodes of the diodes 89 – 94 of the rectifier 71, whereas its cathode is coupled, via the diode 115 and the choke 112, to the common point of connection of the stabilizer 73 to the cathodes of the additional thyristors 95–100. The cathode of the thyristor 121 is also connected to the diodes 101 and 102 of the automatic reclosing unit 74.

Connected between the plate and the control electrode 120 of the thyristor 121 is a capacitor 124 which makes it possible to accelerate the switching on of the thyristor 121, as voltage appears across the choke 112 at a moment of commutation of the output circuit 77–78.

In order to insulate the rectifier 71 from the load 123, as the thyristor 121 is switched on, connected to the power circuit of the power source are a thyristor 125 and two diodes, 126 and 127.

The plate of the thyristor 125 is connected to that of the thyristor 121 and coupled, via a resistor 128, to a control electrode 129. The cathode of the thyristor 125 is connected to the output terminal 77 of the power source.

The diodes 126 and 127 are interconnected in series, the plates thereof facing the output terminal 78 of the power source, whereas their cathodes face the choke 112.

The additional power supply channel is designed for feeding the load 123 during breaks in the output voltage of the rectifier 71 of the power source in the course of commutation of the output circuit 77–78. The output power of the additional channel 75 must be less than the maximum permissible power with regard to spark-proofing requirements.

The additional channel comprises three windings 130–132 which form a star connection. The free ends of the windings are connected to a three-phase half-wave rectifier built around diodes 133–138. The cathodes of the diodes 133–135 are connected to a common outlet, and coupled, via a resistor 139, to a stabilizer 140 and the output terminal 77 of the power source. The plates of the diodes 136–138 are also connected to a common outlet and to a stabilitron 141 and coupled, via the diode 76, to the second output terminal 78 of the power source. The stabilitrons 140 and 141 are interconnected in series.

The value of the resistance of the resistor 139 and the type of the stabilitrons 140 and 141 are selected so that the current and voltage across the output of the feed channel should not exceed sparkproof values.

The power source with a sparkproof output shown in FIG. 1 operates as follows.

As the power source is switched on, the voltage of the feed line is converted by the transformer 1 and the rectifier 2 and is applied to the load.

Normal or emergency commutations in the output circuit 61–62 of the power source induce an electromotive force in the choke 50, which is detected by the rectifier with the diodes 51–54 and actuates the thyristor 59 through the circuit 57–58–60.

In case of breaking the output circuit 61–62 of the power source, as well as the load 63, flowing across the control electrode 58 of the thyristor 59 is current of the capacitor 64, which is added to the current of the rectifier with the diodes 51–54 and accelerates the switching on of the thyristor 59. The thyristor 59 short-circuits the output 61–62 of the power source. As this takes place, the value of the voltage drop across the conducting thyristor 59 and the diode 53 is not enough to keep the thyristor 65 and the diodes 66 and 67 conducting. The thyristor 65 is non-conducting, thus insulating the output circuit 61–62 of the power source from the rectifier 2 thereof.

Following the operation of the spark proofing unit 3, short-circuit current of the power source flows across the resistor 6. A control signal sent from the resistor 6 to the thyristors 22–27 via the resistors 34–39 and the diodes 28–33, through the control electrodes 41–46, is capable of actuating them. The thyristors 22–27, across which at the given moment there is anode voltage, are actuated, reducing current across the thyristor 59. The latter is not conducting.

A period of time during which no current is supplied to the load 63 is determined by the number of phases of the rectifier 2; for the six-phase rectifier of the feed line, at a frequency of 50 Hz, it amounts to no more than 3.3 sec.

As the sinusoidal voltage across the output windings 10–15 passes through zero, power supply is restored in the output circuit 61–62. An increase in the current through this circuit is determined by an increase in the phase voltages and currents. As the process develops, a signal that appears in the choke 50 is not sufficient to actuate the thyristor 59. The thyristor 59 of the spark proofing unit 3 is actuated in the course of subsequent commutations of the load 63.

Voltage across the load 63 is restored to reach a rated value.

In case of another commutation of the load 63 or the output circuit 61–62 of the power source, the spark proofing unit 3 operates again, and the process is repeated.

The power source shown in FIG. 2 operates in a similar manner, with the exception of the automatic reclosing unit 74 and the additional feed channel 75 with the diode 76.

As the spark proofing unit 72 operates, the additional thyristors 95–100 of the automatic reclosing unit become conducting through the output voltage of the rectifier 71, which is applied, via the stabilizer 73, the conducting thyristor 121, the diodes 101 and 102 and the resistor 79, to the control electrodes 103–108 of the additional thyristors 95–100. As the thyristor 125 and the diodes 126 and 127 are closed, output voltage of the additional feed channel 75 makes conducting the diode 76, which, until the operation of the spark proofing unit 72, has been closed by voltage of the rectifier 71, the voltage being applied to the load 123, thereby excluding breaks in the feeding of the load.

With current flowing through the load 123, there is a voltage drop across the effective resistor of the choke 112, which may erroneously actuate the additional thyristors 95–100.

This is avoided by incorporating the diodes 101 and 102 in the circuit of the control electrodes 103–108 of the additional thyristors 94–100.

As voltage of the rectifier 71 is applied to the output terminals 77–78 of the power source, the diode 76 is rendered non-conducting. The supply of energy to the load 123 from the additional feed channel 75 is discontinued. Current of the rectifier 71 flows through the load 123.

Connecting the additional feed channel 75 to the output circuit 77–78 via the diode 76 rules out the chance of simultaneously supplying to the electric discharge energy from the rectifier 71 and the additional feed channel 75, as the diode 76 conducts only after operation of the spark proofing unit 72 and, thus, does not impair spark-proofing potential of the power source.

What is claimed is:

1. A power source with a sparkproof output, comrpising: a transformer; a rectifier connected to the output of said transformer; spark proofing circuit means for limiting electric energy released in the course of commutation of an output circuit of said power source and incorporating an inductive element and thyristors; said spark proofing circuit means being connected to the output of said rectifier; and automatic reclosing circuit means for restoring output electric parameters of said power source following operation of said spark proofing circuit means and comprising additional thyristors and diodes; each of said additional thyristors being connected in parallel with a respective output winding of said transformer, the number thereof corresponding to that of the output windings of said transformer; said diodes being connected to control circuits of said additional thyristors.

2. A power source as claimed in claim 1, further comprising: an additional feed channel coupled via a diode to said output of said power source, said additional feed channel being made in the form of an additional transformer and a half-wave rectifier connected to the output of said additional transformer.

* * * * *